United States Patent [19]

Myers

[11] Patent Number: 4,461,147

[45] Date of Patent: Jul. 24, 1984

[54] VARIABLE DISPLACEMENT HYDRAULIC CONTROL WITH OVERRIDE

[75] Inventor: H. Allen Myers, Ames, Iowa

[73] Assignee: Sundstrand Corporation, Rockford, Ill.

[21] Appl. No.: 315,381

[22] Filed: Oct. 27, 1981

[51] Int. Cl.³ .............................................. F16D 31/02
[52] U.S. Cl. ...................................... 60/389; 60/390; 60/444; 60/448
[58] Field of Search ................ 60/449, 430, 389, 448, 60/444, 443, 390, 445, 447

[56] References Cited

U.S. PATENT DOCUMENTS

| | | | |
|---|---|---|---|
| 3,212,263 | 10/1965 | Hann | 60/389 |
| 3,365,886 | 1/1968 | Moon | 60/443 |
| 3,603,084 | 9/1971 | Okazaki | 60/389 |
| 3,650,108 | 3/1972 | Isaac | 60/444 |
| 3,746,115 | 7/1973 | Bosch | 60/443 |
| 3,901,031 | 8/1975 | Knapp et al. | 60/395 |
| 3,943,715 | 3/1976 | Miyao et al. | 60/447 |
| 3,978,668 | 9/1976 | Nonmenmacher | 60/448 |
| 4,351,152 | 9/1982 | Reynolds | 60/448 |
| 4,364,230 | 12/1982 | Holmes | 60/447 |

*Primary Examiner*—Robert E. Garrett
*Assistant Examiner*—Randolph A. Smith
*Attorney, Agent, or Firm*—James A. Wanner; Ted E. Killingsworth; Harold A. Williamson

[57] ABSTRACT

In the preferred form, the invention disclosed herein provides a single servo control valve to modulate the flow of control fluid to a servo mechanism of a variable displacement pump wherein the single valve is provided with both a manual primary input and an electro-hydraulic secondary input which modulates the primary input. The servo valve is spring biased toward a neutral position with the manual input displacement command being applied to such servo valve through a resilient linkage. Also applied to the servo valve is a hydraulic signal which is electrically controlled to modify the displacement of the servo valve relative to the yieldably applied manual input.

12 Claims, 5 Drawing Figures

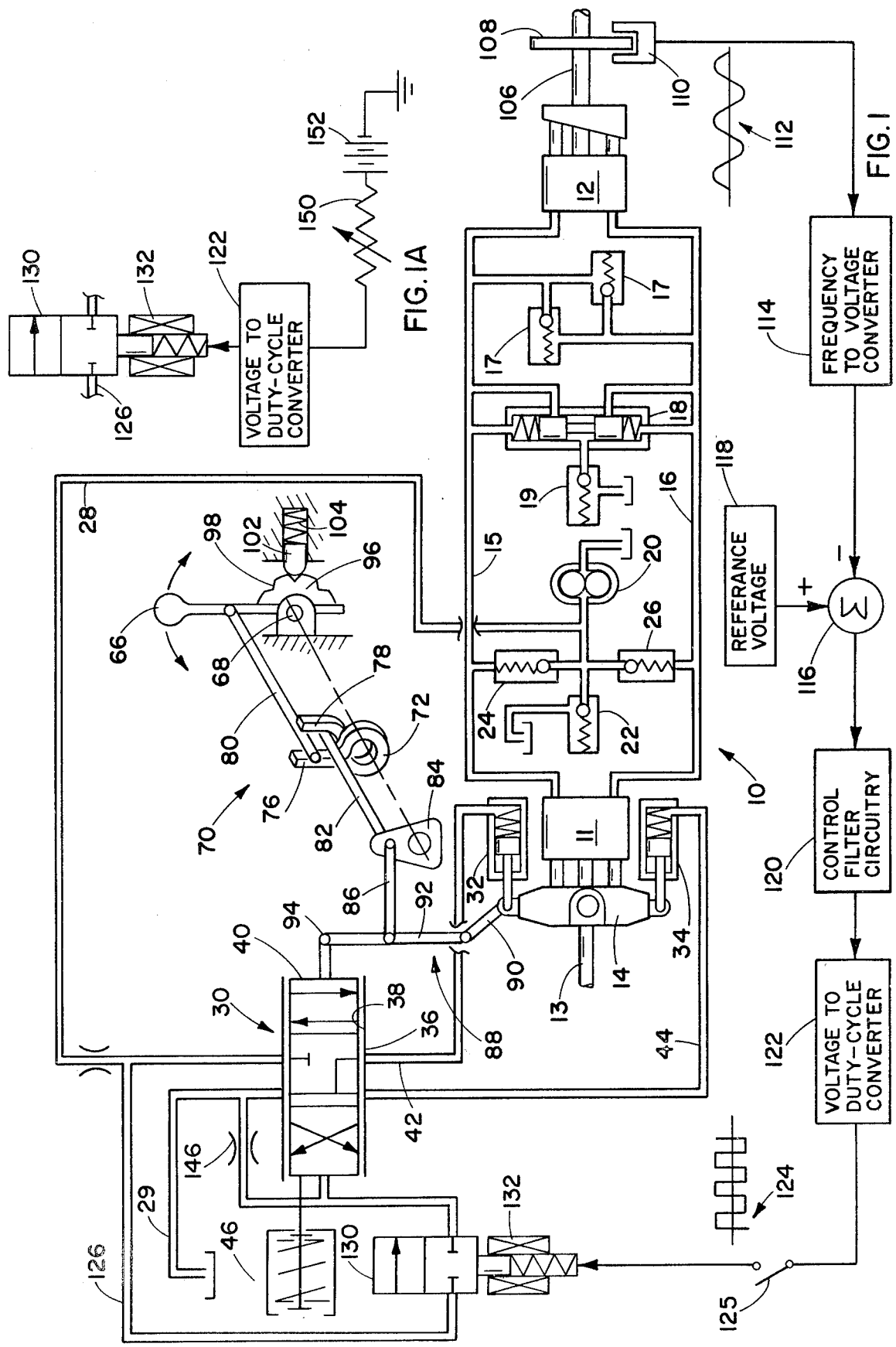

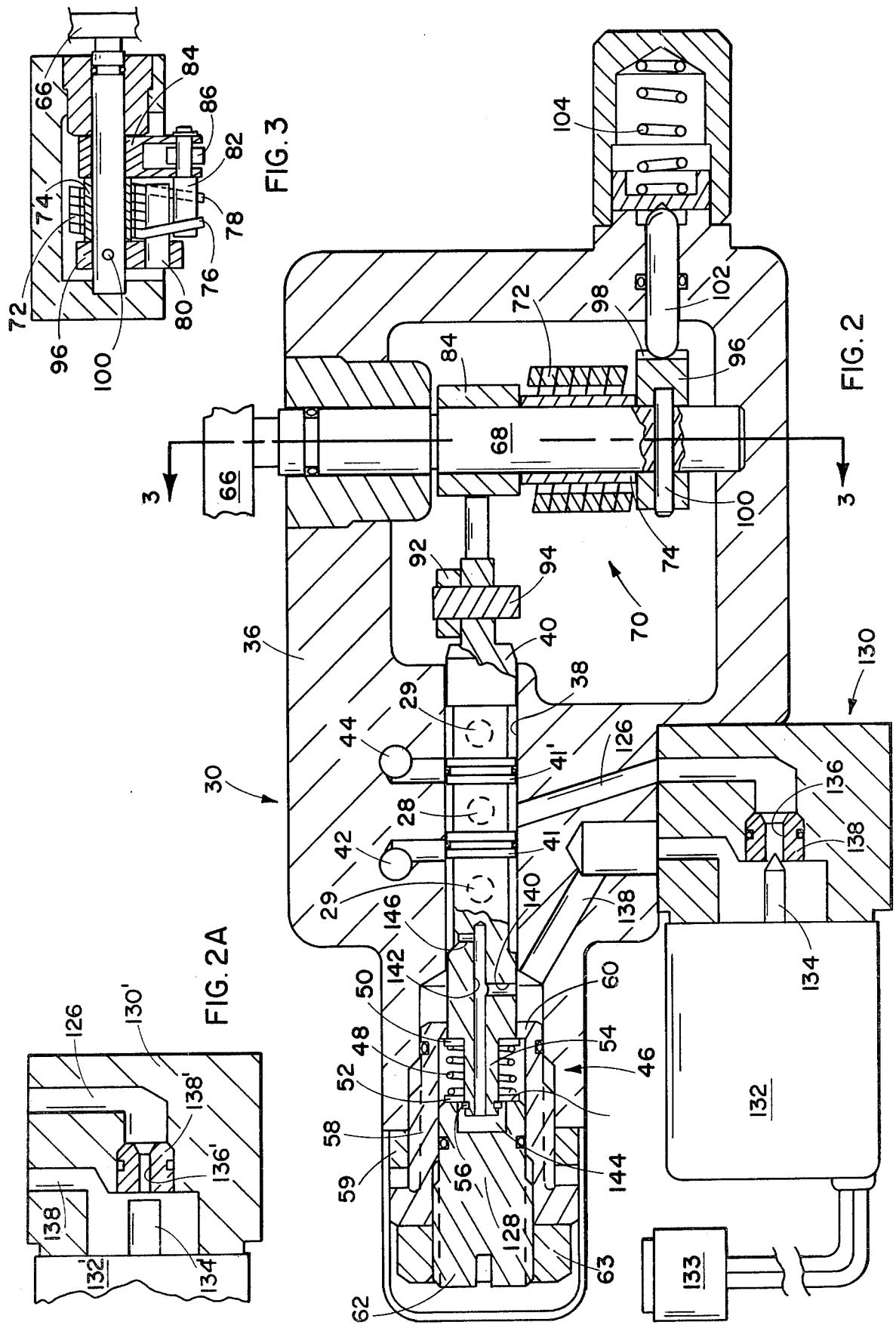

VARIABLE DISPLACEMENT HYDRAULIC CONTROL WITH OVERRIDE

TECHNICAL FIELD

This invention relates to a hydraulic servo control mechanism for a variable displacement hydraulic pump wherein a first manual input provides the primary setting of the servo control mechanism and a secondary electro-hydraulic input is utilized to modulate the manual input setting of the servo control mechanism.

BACKGROUND ART

It is well known in the art to utilize a hydraulic servo control mechanism to control the displacement of a variable displacement pump to modulate the drive of a hydraulic load. The hydraulic servo control mechanism usually comprises a manually controlled servo valve which modulates the flow of control fluid to a servo motor which is connected to the variable displacement pump in a manner to vary the displacement thereof. As per Hann U.S. Pat. No. 3,212,263 issued on Oct. 19, 1965, it is also known to utilize a resilient link to yieldably apply a manual input to the servo valve in a manner which prevents an excessive manual force from being applied to the servo valve. The resiliently applied manual input cooperates with a pump swash plate feedback linkage which senses the instantaneous displacement of the variable displacement pump to control flow through the servo valve to maintain the swash plate in a position proportional to the input command. The advantages of such system are fully described and disclosed in the aforesaid Hann patent.

It is further known to utilize an electrical control signal to modulate the flow of control fluid to a servo motor which controls the displacement of the pump. As per Moon U.S. Pat. No. 3,365,886 issued Jan. 30, 1968, an electric override control signal is provided by a centrifugal governor on the output shaft of a variable displacement hydraulic transmission. The speed signal controls a solenoid valve which modulates the flow of control fluid. Such electrically controlled modulation of the control fluid is upstream and separate from the manually controlled displacement control valve.

It is furthermore known to use electrically controlled pilot valves to modulate the flow of control fluid from a charge pump in a manner to axially position a servo valve which controls flow to a swash plate servo motor. Such a system is taught in Knapp et al. U.S. Pat. No. 3,901,031 issued Aug. 26, 1975. This reference teaches electrically sensing the swash plate angle and utilizing an electronic circuit to provide a control signal proportional to such swash plate angle when compared to a reference electrical signal representative of a desired swash plate angle. Solenoid valves are modulated by such control signal to hydraulically position the servo valve. There is no manual input to the servo valve and thus there is no force balancing between the electro-hydraulic input and a manual primary command signal.

DISCLOSURE OF THE INVENTION

The primary feature of the invention disclosed herein is to provide a single relatively inexpensive servo control valve to modulate the flow of control fluid to a servo mechanism of a variable displacement pump wherein the single valve is provided with both a manual primary input and a secondary input which modulates the primary input. Preferably, the servo valve is spring biased toward a neutral position with a manual input displacement command being provided to such servo valve through a resilient linkage. Also applied to the servo valve is a hydraulic signal to modify the displacement of the servo valve relative to the manual input.

It is thus an object of the present invention to provide a single servo valve to modify the displacement of a variable displacement pump in response to both a primary manual input and a secondary electro-hydraulic input which modulates the valve position relative to the manual input.

The present invention, in one preferred form, senses a system parameter of a hydraulic transmission driven by the variable displacement pump to generate a control signal which in turn modulates the displacement of the variable displacement pump relative to an operator primary command.

It is an object of another embodiment of the invention to provide a remote control station which provides an electro-hydraulic signal which is applied against a servo valve previously positioned by an operator primary command.

Another object of the present invention is to obtain a proportional electro-hydraulic control of swash plate angle by balancing the forces applied to the swash plate servo valve including a centering spring, a primary manual input, swash plate feedback and the secondary electro-hydraulic input.

Thus a primary object of the present invention is to provide an override control for a hydraulic system comprising a variable displacement hydraulic pump driving a motor, a hydraulic servo mechanism comprising a servo motor coupled to the pump to vary the displacement thereof and a servo valve having a movable valve element for controlling the flow of control fluid to the servo motor, a first manual input resiliently connected to the valve element to establish a primary control position for said valve element, an expandable fluid chamber device operatively connected to the valve element so as to move the valve element against the bias of the manual input when the expandable chamber is subjected to fluid flow, a pilot valve modifying the flow of control fluid to said expandable chamber, and a second input means applying a control signal to the pilot valve for modulating the control fluid bias on the servo valve to modify the resiliently applied manual input.

Yet another object of the present invention is to provide an electric override control for a hydraulic system comprising a variable displacement hydraulic pump including a swash plate movable to modify the output flow of the pump, a motor hydraulically connected to flow of the pump to be driven thereby, a hydraulic servo mechanism comprising a servo motor for positioning the swash plate and a servo valve having a movable valve element for controlling the flow of control fluid to the servo motor, a feedback linkage operatively connecting the swash plate and the movable valve element, a moveable manual control providing a primary input signal, a resilient linkage interconnecting the manual control and the feedback linkage, an expandable fluid chamber device operatively connected to the valve element and adapted to move the valve element when subjected to fluid flow, a pilot line connected to the expandable chamber, an electrically operated pilot valve in said pilot line adapted to modulate the flow of control fluid to the expandable chamber, and secondary input means providing an electric control signal to be applied to the pilot valve to permit the flow of control fluid to the expandable chamber in a manner to modulate the position of the movable valve element relative to a position established by the feedback linkage and the primary manual input.

BRIEF DESCRIPTION OF THE DRAWINGS

FIG. 1 is a schematic diagram of a control circuit utilizing the present invention to control the displacement of a variable displacement pump;

FIG. 1A is a partial schematic diagram showing a modification to the control circuit of FIG. 1;

FIG. 2 is a sectional view of a servo valve structure including a solenoid valve to be utilized in the control of FIG. 1; and FIG. 2A is a partial sectional view showing a force motor valve to be used in place of the solenoid valve of FIG. 2.

FIG. 3 is a partial sectional view taken along lines 3—3 of FIG. 2.

BEST MODE FOR CARRYING OUT THE INVENTION

While the present invention is susceptible of embodiment in many different forms, there is shown in the drawings and will herein be described in detail various embodiments of the invention with the understanding that the present disclosure is to be considered an exemplification of the principals of the invention and not intended to limit the invention to the embodiments illustrated. The scope of the invention will be pointed out in the appended claims.

Referring to FIG. 1, a hydrostatic transmission 10 includes a reversible variable displacement axial piston pump 11 and a fixed displacement axial piston motor 12. The transmission is adapted to be driven by a prime mover or engine (not shown) through an input shaft 13 connected to the pump 11. The pump 11 is provided with an angularly positioned swash plate 14 which modifies both the amount of flow and the direction of flow of the pump output in a manner well known. The pump 11 is connected to the motor 12 by main loop fluid lines 15 and 16 in a manner to drive the motor 12. While the embodiment shown is a hydrostatic vehicle transmission, the motor 12 may also be a cylinder motor such as a hydraulic ram. It is common in the transmissions of the type shown, that lines 15 and 16 are provided with high pressure relief valves 17 and a shuttle valve 18 connected to a pressure relief valve 19.

Furthermore, as is common practice, the transmission is provided with a charge pump 20 which is driven by the input shaft 13. The output of the charge pump 20 is controlled by a charge pressure relief valve 22 and flows through check valves 24 and 26 to either line 15 or 16, depending upon which is at low pressure, to replenish lost hydraulic fluids to the transmission main loop. The output of the charge pump 20 is also directed to a control fluid line 28.

The variable displacement pump 11 is provided with a servo mechanism which consists of a servo valve 30 and a servo motor consisting of dual servo cylinder devices 32 and 34 connected to the swash plate 14. The servo valve 30 controls both the direction and amount of flow from control fluid line 28 to the servo motor cylinders to vary the angular displacement of the pump swash plate 14. The servo valve 30 also controls the fluid communication between the servo motor cylinders and a drain line 29. Although two servo cylinders are taught, it is also known in the art to have a servo motor consisting of a single dual acting servo cylinder.

The servo valve 30 has a stationary valve body 36 which defines a valve bore 38. Located within the valve bore 38 is a movable servo valve element 40 which may be axially displaced with respect to the valve bore 38 to control flow through the servo valve 30. Servo motor lines 42 and 44 connect swash plate servo cylinders 32 and 34 respectively with the valve bore 38. Furthermore the control fluid line 28 and drain line 29 are also in communication with the valve bore 38. The servo valve element 40 is provided with two axially spaced apart lands 41 and 41' which prevent flow from control fluid line 28 and servo motor lines 42 and 44 when the valve element 40 is centered. When the valve element 40 is moved toward the right, land 41' uncovers the port where servo motor line 44 communicates with the valve bore 38 so that control fluid may pass from the centrally located control fluid line 28 to servo motor line 44 and thus pressurize the servo cylinder 34. At the same time, land 41 uncovers the port communicating servo motor line 42 to permit flow from servo cylinder 32 to drain line 29. Movement of the valve element 40 toward the left directs flow in the opposite direction to connect servo motor line 42 and servo cylinder 32 to control fluid line 28 while draining servo cylinder 34. To permit selective flow to drain from both servo cylinders 32 and 34, drain line 29 is ported to the valve bore 38 toward both the right and left ends thereof and outboard of the valve element lands 41 and 41'. It is the progressive axial positioning of the movable valve element 40 that modulatingly controls the fluid communication between the swash plate servo cylinders 32 and 34 and the fluid control line 28 or drain line 29 in a manner well known.

The servo valve 30 is biased toward a centered position preventing the flow from the control fluid line 28 to either of the servo cylinders by a centering spring mechanism 46 shown schematically in FIG. 1 and in greater detail in FIG. 2. The spring mechanism 46 consists of a single coil spring 48 located between two washers 50 and 52, all located about a reduced diameter stem portion 54 of the movable valve element 40. The washer 50 abuts the stepped-down portion between the valve stem 54 and the main portion of the valve element 40 while the washer 52 abuts a lock ring 56 secured to the free end of the valve stem 54.

An adjustment sleeve 58 with lock nut 59 is threadably located with respect to the valve body 36 and includes an internal flange 60. An adjustable plug 62 with threaded lock nut 63 is threadably located within the sleeve 58 and has a peripherally located end wall 64. The threaded sleeve 58 and the threaded plug 62 furthermore provide a factory preset to adjustably locate the movable valve element 40 in a centered position and take up spring backlash. The internal flange 60 and the end wall 64 furthermore provide abutment stops for the spring washers 50 and 52 to permit compression of the centering spring 48 when the valve element 40 is moved toward the right and toward the left respectively. Thus when the valve element 40 is moved to the right, the lock ring 56 and washer 52 compress the coil spring 48 against flange 60. When the valve element 40 is moved toward the left, the stepped-down portion between the valve stem 54 and the main portion of the valve element 40 abut the washer 50 to compress the coil spring 48 against end wall 64.

To establish a primary control position for the movable valve element 40, a manual input means is provided consisting of a handle 66 pivotably mounted by a pin 68 and connected to a resilient linkage means 70. Resilient link 70 functions similarly to the centering spring mechanism 46 in that it yieldably applies a force in two directions but utilizes only a single spring means. The spring element for the resilient link 70 consists of a coiled torsion spring 72 with the coiled portion thereof surrounding a sleeve 74 so as to be angularly movable about pin 68 (as seen in FIG. 2). The coiled torsion spring has legs 76 and 78 which form a bifurcated connection with pins 80 and 82. Movement of the pin 80 is controlled by the manual control handle 66. In the preferred structure taught in FIGS. 2 and 3, handle 66 and a cam 96 are secured to the pin 68 for common angular displacement. The pin 80 is connected to the cam 96. Movement of the cam 96 imparts movement to pin 80 and thus to pin 82 through the bifurcated torsion spring 72. To provide better clarity, the relative position of pins 80 and 82 is reversed in FIG. 1 to that shown in FIG. 3. A lever 84 is pivotably mounted on pin 68 and is eccentrically connected to a link 86 by the pin 82. Thus, any angular displacement of pin 82 imparted by the bifurcated torsion spring 72 causes movement of link 86. Therefore, the movement of the handle 66 is imparted to link 86 in a manner that would prevent the transfer of excessive manual force.

Swash plate 14 is provided with a feedback linkage 88 consisting of a link 90 connected to the swash plate 14 and a link 92 connected to the servo valve element 40 by means of a pin 94. The manual input is yieldably applied to the feedback link 92 by resilient linkage 70 and link 86. The manual input through the yieldable link 70 and the swash plate feedback linkage 88 provide a mechanical primary input to the servo valve movable element 40 which axially positions such valve element 40 against the bias of the dual acting centering spring mechanism 46. When a manual input is applied to the handle 66, this imparts an axial motion to the valve element 40 which initiates fluid flow from the control fluid line 28 to one or the other of the servo cylinder lines 42 or 44 and thus to the servo cylinder 32 or 34 to cause angular movement of the swash plate 14. Such angular movement imparts a corresponding movement to the feedback linkage 88 which further axially positions the movable valve element 40 relative to the manual input to maintain sufficient flow to the servo cylinders 32 or 34 to maintain the swash plate 14 in an angular position corresponding to the manual input. This displacement balancing between the resiliently applied manual input and the swash plate feedback to position a servo valve element is taught in Hann U.S. Pat. No. 3,212,263 as previously mentioned in the Background Art.

As seen in FIG. 2, the cam 96 having notches 98 is secured to handle pivot pin 68 by means of a pin 100 so that rotational movement of the handle 66 is also imparted to the cam 96. Cooperating with the cam 96 is a detent mechanism 102 biased by spring 104. The detent mechanism 102 engages the cam notches 98 to maintain the handle 66 in a preselected position. While the cam notches as shown in FIG. 1 provide a neutral position, one forward position and one reverse position, a plurality of angular positions may be selected by providing a plurality of notches 98. Furthermore it is contemplated that a friction mechanism could also be utilized instead of the spring detent mechanism to maintain the handle in a preselected position.

The control described so far provides constant displacement of the axial piston pump 11 relative to a manual input. It is sometimes desirous to further modify the displacement of the pump to modify pump output flow. One such example is when pump 11 and motor 12 form a hydraulic transmission for propelling a vehicle. On level terrain and with constant load, a given position of handle 66 will maintain constant vehicle speed. However, when the vehicle encounters an incline or other increase in vehicle load, the speed of the transmission will be reduced. To compensate this reduction in speed, the motor output shaft 106 is provided with a tachometer consisting of a magnetic wheel 108 and an electronic pick-up 110. Many suitable types of tachometers are well known. One type contemplated will provide an electrical output proportional to the rotational speed of shaft 106 in the form of a sine wave represented by wave form 112. This sine wave is fed to a frequency to voltage converter 114 and then to a summing device 116 which compares an actual speed signal generated by the tachometer with a reference speed signal represented by reference voltage generator 118. The output from the summer 116 is then supplied to a control filter circuitry 120 and voltage to duty-cycle converter 122 to generate an electrical control signal represented by square wave 124 as is well known in the electronic control circuit art.

The control signal 124 is used as a secondary input to modify the primary or mechanical input to servo valve 30 described above. In order to apply the secondary control signal without requiring a separate complicated control device, a servo valve pilot line 126 connects the control fluid line 28 with an expandable chamber device 128 adapted to act on the servo valve movable element 40 in a manner to cause axial movement thereof against the bias of the centering spring mechanism 46 and any mechanical input to the valve element 40. As seen in FIG. 2, both the control fluid line 28 and pilot line 126 join the servo valve bore 38 at a central location so they are always in fluid communication. Located in the pilot line 126 is an electrically controlled pilot valve 130.

The pilot valve 130 in one form of the invention is a two position valve operated by a solenoid 132. The solenoid 132 is connected to the electric control circuitry by an electrical connector 133. In this form, the pilot valve 130 either permits full flow or prohibits flow in the pilot line 126 to the expandable chamber device 128. The pilot valve 130 includes a pin 134 which seats in the bore 136 of valve seat 138 due to the influence of the solenoid spring (not shown) when no current is provided to the solenoid 132. When current is provided, the pin 134 is lifted from the bore 136 to permit flow from pilot line 126 to the expandable chamber device 128 through a line 138. The frequency and/or the pulse width duration of the square wave 124 (depending on the type control chosen) thus controls the amount of flow through the pilot line 126 in proportion to the speed output signal generated by the tachometer pick-up 110. The electronic control circuit may be selectively actuated by a manual control switch 125.

The movable valve element 40 is provided with a radial bore 140 which communicates with an axial bore 142. Bores 140 and 142 communicate with line 138 leading from the pilot valve 130 to permit flow of control fluid from the pilot line 126 to the expandable chamber device 128. The expandable chamber device 128 consists of a chamber 144 defined by plug 62, the inside of the adjustable sleeve 58 and the end of the valve element 40. When control fluid is allowed to pass from control fluid line 28 and pilot line 126 by the opening of the valve 130, pressure is generated in the fluid chamber 144 which biases the movable valve element 40 toward the right against any forces applied by the centering spring mechanism 46 and mechanical forces applied by the swash plate feedback mechanism and manual input previously described.

The valve element 40 is also provided with a second radial bore in the form of a restricted orifice 146. The restricted orifice 146 connects chamber 144 by means of axial bore 142 to valve bore 38 which is in communication with drain line 29. The restricted orifice 146 is of such size to permit flow from the chamber 144 to drain when there is no flow from pilot line 126 and thus remove fluid pressure from the chamber 144 in a manner to permit the movable valve element 40 to move toward the left in accordance with other forces applied thereto. The restricted orifice 146 however is of such reduced size as to allow pressure build up in chamber 144 from flow in pilot line 126 when the valve 130 is opened.

The electrical control signal as represented by the square wave 124 causes a rapid pulsing of the solenoid 132 and thus a rapid opening and closing of the valve 130 in a manner which modulates flow through a pilot line 126 proportional to the speed signal generated by the tachometer pick-up 110.

In another embodiment of the preferred form of the invention as shown in partial sectional view FIG. 2A, the solenoid control valve 130 is replaced by an electronically controlled electric force motor control valve 130', of the type commercially supplied by the Fema Corporation. In this embodiment, the valve stem 134' is axially positioned by the force motor 132' proportional to the voltage applied to the force motor 132'. The axial distance between the valve stem 134' and the bore 136' in the valve seat 138' controls the amount of flow through the bore 136'. This is utilized to modulate the flow through the pilot line 126 in a manner similar to the control of the solenoid control valve 130. With the solenoid control valve, a pulsating electrical control signal is provided as represented by the square wave 124. With the electric force motor control valve 130', a steady voltage output is generated by the voltage to duty-cycle converter 122 proportional to actual speed signal generated by the tachometer pick-up 110. This steady signal then modulates the axial positioning of the valve stem 132' to modulate the flow of control fluid through the bore 136'.

Another use for the electric override control of the present invention is shown in an embodiment taught in partial schematic view FIG. 1A. This embodiment, rather than using an electric signal generated by a system parameter such as transmission output speed, uses an electric remote control station to generate the electric control signal. In a product application such as a cement mixer having a drum driven by the hydrostatic transmission, a vehicle operator provides a manual input to determine a preset drum speed in a manner as discussed above. At a remote station, a manually controlled electric rheostat 150 is provided which when used in conjunction with a voltage source 152 provides an input voltage signal to duty-cycle converter 122. The converter 122 converts the voltage signal into an electrical control signal such as the square wave 124 to control the solenoid 132 which modulates the pilot valve 130 in a manner similar to the speed control of FIG. 1. If it is chosen with this embodiment to use an electric force motor 132' such as taught in FIG. 2a, the output of the voltage to duty-cycle converter 122 would be a steady voltage signal proportional to the voltage input from the manually controlled rheostat 150. In this manner, the solenoid or electric force motor may be utilized to modulate the hydraulic bias on the servo valve 40 proportional to a voltage signal generated at a manually controlled remote station and thus provide the secondary input or electric override.

The manual input and swash plate feedback mechanism described above, provides a displacement balancing system for controlling the position of the servo valve element 40. The override control system of the present invention, by providing a force which acts directly on the servo valve element 40, provides a force balancing system when used in conjunction with a yieldably applied manual input. The override control, by modulating the flow through pilot valve 130, generates a pressure within the chamber 144 of the expandable chamber device 128. This pressure provides a force on the left end of the movable valve element 40 which biases the valve element 40 to the right against any previously supplied manual primary input. Yieldable linkage 70 permits the rightward movement of the valve element 40 due to the pressure generated in chamber 144 even though the manual input is fixed. Furthermore, the yieldable linkage 70, due to the spring 72, provides a reactive force which counterbalances the force generated by the expandable chamber device 128.

In one example of operation wherein the transmission 10 is used to provide the propulsion for a vehicle, the vehicle operator moves the handle 66 toward the right so as to provide a manual primary input into the control. This clockwise movement of the handle 66 imparts right-hand movement to the link 86 through clockwise movement of pin 80, the bifurcated resilient spring 72 and pin 82. This imparts right-hand movement to the valve element 40 to permit control fluid to flow from line 28 through the servo valve 30 to servo motor line 44 and servo cylinder 34 to cause clockwise rotation of the swash plate 14. This angular movement of the swash plate 14 increases the displacement of the pump 11 to generate forward vehicle propulsion. The clockwise movement of the swash plate 14 also imparts counterclockwise movement to the swash plate feedback linkage 88. This pivots link 92 counterclockwise around its connection to link 86 (held stationary by the detented manual input) to move pin 94 and thus servo valve element 40 toward the left to counter the previous right-hand movement of the servo valve element 40. When the swash plate 14 has reached an angular displacement proportional to the manual input, the servo valve element 40 will again be centered due to the cooperation between the manual input and the motion of the feedback linkage 88 to prevent further flow to the servo cylinder 34. This displacement balance continues to modulate flow through the servo valve 30 to maintain the angular position of the swash plate 14 relative to manual input until an outside force is further applied to the servo valve element 40.

The override control of the present invention provides a further or secondary input to the servo valve 30. Assuming the modification taught in FIG. 1 is chosen, as vehicle speed slows due to an incline or other load, the output speed signal 112 generated by the tachometer will be reduced. This is compared to reference voltage 118 which is proportional to desired vehicle speed. The control circuitry provides a control signal to the solenoid valve 132 which opens pilot valve 130 to cause flow from pilot line 126 to the expandable chamber device 128. This flow generates a right-hand force on the valve element 40 biasing it toward the right against the resiliently applied manual input from the handle 66, resilient link 70 and the feedback linkage 88. The right-hand movement of servo valve element 40 generated by the secondary input causes further flow of control fluid from line 28 to servo motor line 44 and thus servo cylinder 34. This increases clockwise rotation to the swash plate 14 to increase the displacement of pump 11 and thus increase the forward propulsion drive of the vehicle. It is noted that the force generated by the secondary input acts against the yieldably applied force of the primary input. Since both the primary manual input and the hydraulically applied secondary input act on the servo valve element 40, these forces are balanced in a nature not permitted by a separate manual control and override control. When the vehicle has reached the desired speed determined by the reference voltage 118, the input to solenoid 132 reduces the modulated flow through pilot valve 130 to a point which balances the flow through the restricted orifice 136 to drain line 29 thus stablizing the secondary input to the servo valve element 40. If an overspeed condition occurs, the tachometer generated control signal reduces the input to the pilot valve 130 which reduces flow to the expandable chamber device 128 to a point below that flow permitted by the restricted orifice 136. This allows the expandable chamber device 128 to drain permitting the servo valve element 40 to move toward the left due to the resiliently applied manual input.

The above described operation works in a similar manner whether the pilot valve is a solenoid control valve 130 as depicted in FIGS. 1 and 2 or an electric force motor valve 130' as depicted in FIG. 2A. Furthermore the same fluid flow and force balancing described above is generated by a control signal generated by a remote station 150 as depicted in FIG. 1A which may utilize either the solenoid control valve 130 or the electric force motor control valve 130'. It is of course contemplated by the present invention to use a system parameter to generate a control signal which reduces pump displacement or provides reverse operation. It is furthermore contemplated by the present invention to have two secondary inputs applied to the servo valve element 40 by duplicating the pilot control loop 126 and 130 and adding a second expandable chamber device 128 to the right side of the servo control valve element 40. Thus a positive control force can be applied to both sides of the servo valve, one for an underspeed condition and one for an overspeed condition, in addition to manual input. The balancing of forces supplied by the yieldably applied manual primary input and hydraulically applied secondary input to a single servo valve provides a particularly effective electric override control and thus meets the objectives of the present invention.

I claim:

1. An electric override control for a hydraulic system comprising; a variable displacement hydraulic pump, motor means hydraulically connected to said pump to be driven thereby, a source of control fluid, a hydraulic servo mechanism comprising a servo motor coupled to said pump to vary the displacement of said pump and a servo valve having a movable valve element for controlling the flow of control fluid to said servo motor, the improvement comprising:

a first manual input means,
resilient means including a spring operatively connecting said manual input means to said valve element to provide a yieldable force applied to said valve element which establishes a primary control position for said valve element,
expandable fluid chamber means operatively connected to said valve element and adapted to provide a hydraulic force on said valve element to move said valve element against the yieldable force of said resilient means establishing a primary control position when said expandable chamber means is subjected to fluid flow,
an electrically operated valve adapted to pass control fluid from said source to said expandable chamber means, and
a second input means generating an electric control signal to said electrically operated valve to modulate the flow of control fluid to said expandable fluid chamber means to control the hydraulic force on said valve element in a manner which is balanced by the force applied by said spring.

2. An override control for the hydraulic system of claim 1 wherein said second input means includes a remotely positioned manually controlled voltage signal means and an electric control signal generating means for applying a control signal to said electrically operated pilot valve proportional to said voltage signal.

3. An override control for the hydraulic system of claim 1 wherein said second input means includes sensing means responsive to a change in a system parameter to provide a parameter signal and computing means responsive to said parameter signal to provide the control signal.

4. An override control for the hydraulic system of claim 3 wherein the system parameter to be sensed is hydraulic motor output speed and wherein the sensing means consists of a tachometer driven by said hydraulic motor.

5. An override control for the hydraulic system of claim 1 wherein said variable displacement pump has means angularly positioned to set the displacement of said pump and further wherein linkage means connects said angularly positioned means to said valve element to provide a feedback signal.

6. An override control for the hydraulic system of claim 5 wherein the resilient means of said manual input is connected to said feedback linkage.

7. An override control for the hydraulic system of claim 1 wherein said valve element is centrally positioned by resilient centering means.

8. An override control for the hydraulic system of claim 1 wherein said electrically operated valve is a solenoid valve having a full flow and a no flow condition to permit the passage of control fluid or prohibit the passage of control fluid to said expandable fluid chamber means and said second input means provides a pulse width controlled square wave electric control signal to be applied to said solenoid valve.

9. An override control for the hydraulic system of claim 1 wherein said electrically operated valve includes an electric force motor which modulatingly controls the rate of flow through said valve and said second input means provides a voltage regulated signal to be applied to said electric force motor.

10. An electric override control for a hydraulic system comprising a variable displacement hydraulic pump including a pump displacement means movable to modify the output of said pump, motor means hydraulically connected to said pump to be driven thereby, a source of control fluid, a hydraulic servo mechanism comprising a servo motor coupled to said pump displacement means to control the position thereof and a servo valve having a movable valve element for controlling the flow of control fluid from said source to said servo motor, the improvement comprising: feedback linkage means operatively connecting said pump displacement means and said movable valve element to apply a feedback signal to said valve element, moveable manual control means to provide a primary input signal, resilient linkage means interconnecting said manual control means and said feedback linkage, expandable fluid chamber means operatively connected to said valve element and adapted to move said valve element when said expandable fluid chamber means is subjected to fluid flow, a pilot line interconnecting said source of control fluid to said expandable fluid chamber means, an electrically operated pilot valve in said pilot line adapted to pass control fluid to said expandable fluid chamber means, and second input means generating an electric control signal which is applied to said pilot valve to permit the flow of control fluid to said expandable fluid chamber means in a manner to modulate the position of said movable valve element relative to a position established by said feedback linkage and said primary manual input.

11. An electric override control for the hydraulic system of claim 10 wherein said pilot valve is a solenoid valve having a full flow and a no flow condition to permit the passage of control fluid or prohibit the passage of control fluid to said expandable fluid chamber means and said second input means provides a pulse width controlled square wave electric control signal to be applied to said solenoid valve.

12. An electric override control for the hydraulic system of claim 10 wherein said pilot valve includes an electric force motor which modulatingly controls the rate of flow through said pilot valve and said second input means provides a voltage regulated signal to be applied to said electric force motor.

* * * * *